United States Patent
Ida et al.

(10) Patent No.: US 9,057,970 B2
(45) Date of Patent: Jun. 16, 2015

(54) METHOD FOR PRODUCING CORE-SHELL STRUCTURED RESIN MICROPARTICLES AND CORE-SHELL STRUCTURED TONER CONTAINING CORE-SHELL STRUCTURED RESIN MICROPARTICLES

(71) Applicant: CANON KABUSHIKI KAISHA, Tokyo (JP)

(72) Inventors: Hayato Ida, Yokohama (JP); Takashi Hirasa, Yokohama (JP); Ryo Natori, Tokyo (JP); Junichi Tamura, Inagi (JP); Yuya Chimoto, Kawasaki (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/787,675

(22) Filed: Mar. 6, 2013

(65) Prior Publication Data
US 2013/0302732 A1 Nov. 14, 2013

(30) Foreign Application Priority Data
Mar. 9, 2012 (JP) ................................ 2012-053393

(51) Int. Cl.
G03G 9/08 (2006.01)
C08L 25/02 (2006.01)
G03G 9/093 (2006.01)

(52) U.S. Cl.
CPC .............. *G03G 9/0804* (2013.01); *C08L 25/02* (2013.01); *G03G 9/09392* (2013.01)

(58) Field of Classification Search
CPC .................................. C08K 3/08; C08L 25/02
USPC ............................ 430/110.2, 137.13; 523/333
See application file for complete search history.

(56) References Cited

U.S. PATENT DOCUMENTS

| 5,968,689 A * | 10/1999 | Torikoshi et al. ................ 430/18 |
| 7,833,687 B2 | 11/2010 | Kato et al. |
| 2008/0026311 A1 * | 1/2008 | Mizuhata et al. .............. 430/113 |
| 2009/0020899 A1 * | 1/2009 | Matsumoto et al. .............. 264/9 |
| 2012/0040285 A1 | 2/2012 | Shibata et al. |
| 2013/0108955 A1 | 5/2013 | Shibata et al. |
| 2013/0202998 A1 * | 8/2013 | Higashi et al. ............ 430/137.13 |

FOREIGN PATENT DOCUMENTS

| JP | 9-34167 A | 2/1997 |
| JP | 2000-112175 A | 4/2000 |
| JP | 2006-276073 A | 10/2006 |
| JP | 2007-3840 A | 1/2007 |
| JP | 4135654 B2 | 8/2008 |

OTHER PUBLICATIONS

Ida, et al., U.S. Appl. No. 13/886,077, filed May 2, 2013.

* cited by examiner

*Primary Examiner* — Hannah Pak
(74) *Attorney, Agent, or Firm* — Fitzpatrick, Cella, Harper & Scinto

(57) ABSTRACT

Provided is a method for producing core-shell structured resin particles, comprising the steps of: providing a dispersion liquid of hydrophobic resin particles in which the hydrophobic resin particles are dispersed into an aqueous medium containing an anionic surfactant A and an anionic surfactant B; providing a dispersion liquid of resin microparticles in which resin microparticles are dispersed into an aqueous medium; mixing the dispersion liquid of hydrophobic resin particles and the dispersion liquid of resin microparticles; adhering the resin microparticles to surfaces of the hydrophobic resin particles by adding a water soluble metal salt to a mixture resulting from above step, wherein the surfactant A and the surfactant B satisfy the specific conditions.

4 Claims, No Drawings

METHOD FOR PRODUCING CORE-SHELL STRUCTURED RESIN MICROPARTICLES AND CORE-SHELL STRUCTURED TONER CONTAINING CORE-SHELL STRUCTURED RESIN MICROPARTICLES

BACKGROUND OF THE INVENTION

1. Field of the Invention

The present invention relates to a method for producing core-shell structured resin particles. The present invention further relates to core-shell structured toner for developing electrostatic latent images, which contains the core-shell structured resin particles.

2. Description of the Related Art

It is known that core-shell structured particles which is formed of a core and a shell can contain materials having different physical properties in its core and shell, respectively, and can provide various characteristics. Because of these various characteristics, studies for application of core-shell structured particles have been made broadly. For example, studies have been made regarding pharmaceutical products, cosmetic products, electronic materials, foods, adhesives and constructional materials.

Also, in a field of recording material, studies for application of core-shell structured particles are under progress. Recently, for the image formation on the basis of the electrophotographic system, efforts are made to lower the fixation temperature of toner in accordance with greater demand for saving energy. As one example, a suggestion has been made to lower the fixation temperature by using a resin having low softening temperature. However, when the resin having low softening temperature is used for toner without any modification, blocking may occur in a static state, during, for example, storage or transportation of the toner. For such reasons, a suggestion has been made to use core-shell structured toner in which a resin having low softening point is coated with a resin having high softening temperature (Japanese Patent Application Laid-Open Nos. 2006-276073 and 2007-3840, and Japanese Patent Publication No. 4135654).

Meanwhile, even when a core-shell structure is successfully formed, under a highly humid environment, moisture may penetrate into the core to cause a change in physical properties of the core. Thus, in order to avoid the influence of moisture, it can be considered to use hydrophobic resin microparticles as a core and produce core-shell structured toner. However, according to the methods described in Japanese Patent Application Laid-Open Nos. 2006-276073 and 2007-3840, and Japanese Patent Publication No. 4135654, the core particles are prepared in an aqueous medium, and thereby, the core particles exhibit hydrophilicity at a certain level.

According to a kneading pulverization method, resin microparticles are produced in vapor phase, and therefore the resin microparticles having high hydrophobicity can be produced. Moreover, efforts have been made to develop a method for producing core-shell structured toner by dispersing resin microparticles having high hydrophobicity, which have been prepared by a kneading pulverization method, into an aqueous medium (Japanese Patent Application Laid-Open Nos. H9-34167 and 2000-112175).

However, the methods described in Japanese Patent Application Laid-Open Nos. H9-34167 and 2000-112175 use an organic solvent for forming a core-shell structure, and thus a problem remains in that a huge burden on an environment is unavoidable during producing a toner.

SUMMARY OF THE INVENTION

Problem to be Solved by the Invention

An object of the present invention is to produce core-shell structured resin particles containing hydrophobic resin microparticles as a core without substantially using an organic solvent in an aqueous medium.

Means for Solving the Problem

The aforementioned object can be achieved by the present invention as described below.

Specifically, the present invention relates to a method for producing core-shell structured resin particles, comprising the steps of:

(I) providing a dispersion liquid of hydrophobic resin particles in which the hydrophobic resin particles are dispersed into an aqueous medium containing an anionic surfactant A and an anionic surfactant B;

(II) providing a dispersion liquid of resin microparticles in which resin microparticles are dispersed into an aqueous medium;

(III) mixing the dispersion liquid of hydrophobic resin particles and the dispersion liquid of resin microparticles; and (IV) adhering the resin microparticles to surfaces of the hydrophobic resin particles by adding a water soluble metal salt to a mixture resulting from the step (III), wherein the surfactant A and the surfactant B satisfy the following conditions (i) to (iv):

(i) surface tension of 5 mmol/L aqueous solution of the surfactant A<40 mN/m;

(ii) surface tension of 5 mmol/L aqueous solution of the surfactant A, in which the metal salt is contained in an amount to generate an equivalent amount of cations to an amount of anions derived from the surfactant A<40 mN/m;

(iii) surface tension of 5 mmol/L aqueous solution of the surfactant B<40 mN/m; and (iv) surface tension of 5 mmol/L aqueous solution of the surfactant B, in which the metal salt is contained in an amount to generate an equivalent amount of cations to an amount of anions derived from the surfactant B>40 mN/m.

Further, the present invention also relates to a core-shell structured toner which is formed of the aforementioned core-shell structured resin particles.

Further features of the present invention will become apparent from the following description of exemplary embodiments.

DESCRIPTION OF THE EMBODIMENTS

In order to produce core-shell structured resin particles in an aqueous medium, it is necessary to disperse resin microparticles for core and resin microparticles for shell, which are used to be a core and a shell, respectively, into an aqueous medium, and lower the dispersion stability of both resin microparticles by adding a water soluble metal salt or the like to selectively aggregate the resin microparticles for shell on a surface of resin microparticles for core. However, since the hydrophobic resin microparticles have low affinity for water, for dispersing them stably into an aqueous medium, a large amount of a surfactant is required. In addition, it is also found out by the present inventors that, when a large amount of a surfactant is used, formation of core-shell structure that resin microparticles for shell are adhered on a surface of highly hydrophobic resin microparticles for core is difficult to be achieved due to inhibitory action of a surfactant.

Accordingly, the present inventors figured out that, if a system in which a large amount of surfactant is present at the time of dispersing hydrophobic resin microparticles into an aqueous medium, but the amount of surfactant is substantially reduced during the formation process of core-shell structure can be achieved, the formation of core-shell structure can be processed without any inhibition. Thus, in order to substantially reduce the amount of surfactant, inactivation of surface action of a surfactant by interaction between the surfactant and a water soluble metal salt, which are added during an aggregation process, was studied. Specifically, it was tried to use of a surfactant which exhibits the surface action at the time of dispersing hydrophobic resin microparticles into an aqueous medium but loses the surface action by a water soluble metal salt that is added during the formation process of core-shell structure. As a result, it was found that, by using a surfactant having strong interaction with a metal salt in combination with a surfactant having weak interaction with a metal salt, the actual amount of surfactant can be controlled during the formation process of core-shell structure, and therefore formation of the core-shell structure can be achieved favorably.

Hereinafter, the processes for producing core-shell structured resin particles (also simply referred to as a "formation process of core-shell structure") will be described. The formation process of core-shell structure of the present invention includes Step 1, Step 2, Step 3 and Step 4. Further, if necessary, it also includes a fusion step, a cooling step, a post-treatment step, or the like, following Step 4.

<Step 1>

Step 1 is a step for providing dispersion liquid of hydrophobic resin particles in which the hydrophobic resin particles are dispersed into an aqueous medium containing an anionic surfactant A and an anionic surfactant B. According to the present invention, the anionic surfactant A and the anionic surfactant B (hereinafter also simply referred to as "the surfactant A" and "the surfactant B", respectively) satisfy the following conditions (i) to (iv):

(i) surface tension of 5 mmol/L aqueous solution of the surfactant A<40 mN/m;

(ii) surface tension of 5 mmol/L aqueous solution of the surfactant A, in which the metal salt is contained in an amount to generate an equivalent amount of cations to an amount of anions derived from the surfactant A<40 mN/m;

(iii) [surface tension of 5 mmol/L aqueous solution of the surfactant B]<40 mN/m; and (iv) [surface tension of 5 mmol/L aqueous solution of the surfactant B, in which the metal salt is contained in an amount generate an equivalent amount of cations to an amount of anions derived from the surfactant B>40 mN/m.

Both the anionic surfactant A and the anionic surfactant B that are used in the present invention have surface tension of less than 40 mN/m as a 5 mmol/L aqueous solution of surfactant, and they have a surface action that is required for dispersion of hydrophobic resin microparticles. Accordingly, the hydrophobic resin microparticles can be easily dispersed into an aqueous medium.

Further, in the condition (2) and condition (4), the expression "5 mmol/L aqueous solution of the surfactant A, in which the metal salt is contained in an amount to generate an equivalent amount of cations to an amount of anion derived from the surfactant A" indicates an aqueous mixture solution as follows. When a combination of sodium dodecylbenzene sulfonate and magnesium sulfate is taken as an example, it indicates an aqueous mixture solution in which sodium dodecylbenzene sulfonate is present at concentration of 5.0 mmol/L in the aqueous mixture solution, and also magnesium sulfate is present at concentration of 2.5 mmol/L in the aqueous mixture solution.

In the present invention, the surface tension is measured according to the method described below.

<Method for Measuring Surface Tension of Aqueous Solution>

In the present invention, surface tension of an aqueous solution is measured by using an automatic surface tensiometer CBVP-Z (manufactured by Kyowa Interface Science Co., LTD.). Specifically, the measurement is carried out by using the fully automatic mode of an automatic surface tensiometer with a platinum plate cleaned with red heat. The temperature of an aqueous solution was 25° C. at the time of the measurement. Further, when an anionic surfactant is mixed with metal salt, there can be a case in which water insoluble precipitates are produced. However, the measurement of surface tension is carried out with an aqueous solution containing the precipitates without implementing any modification thereto.

The anionic surfactants A and B are not particularly limited if they satisfy the aforementioned physical properties. Preferred examples thereof include an anionic surfactant such as sulfate ester salt, sulfonate salt, carboxylate salt and phosphate ester. Examples of the sulfate ester salt include sodium lauryl sulfate, sodium myristyl sulfate, sodium laureth sulfate, sodium polyoxyethylene alkylphenol sulfonate and ammonium lauryl sulfate.

Examples of the sulfonate salt include sodium 1-hexane sulfonate, sodium 1-octane sulfonate, sodium 1-decane sulfonate, sodium 1-dodecane sulfonate, perfluorobutane sulfonate, straight-chain sodium alkylbenzene sulfonate, sodium toluene sulfonate, sodium cumene sulfonate, sodium octylbenzene sulfonate, sodium dodecylbenzene sulfonate, sodium naphthalene sulfonate, disodium naphthalene disulfonate, trisodium naphthalene trisulfonate and sodium butyl naphthalene sulfonate.

Examples of the carboxylate salt include sodium octanoate, sodium decanoate, sodium laurate, sodium myristate, sodium palmitate, sodium stearate, perfluorononanoic acid, sodium N-lauroyl sarcosinate and sodium cocoylglutaminate.

Examples of the phosphate ester include lauryl phosphate, sodium lauryl phosphate and potassium lauryl phosphate.

Meanwhile, to satisfy the aforementioned conditions, it is necessary for the surfactant A to maintain the surface action without being affected by the water soluble metal salt that is added during Step 4 described below. On the other hand, it is required for the surfactant B to have lower surface action by the water soluble metal salt that is added during Step 4 described below. For such reasons, the surfactant A needs to have a weak interaction with the water soluble metal salt, and therefore a sulfonate salt anionic surfactant is preferably used. On the other hand, the surfactant B needs to have a strong interaction with the water soluble metal salt, and therefore a carboxylate salt anionic surfactant is preferably used. Strong interaction between a surfactant and a water soluble metal salt means that a bond is easily formed between anions derived from a surfactant and cations derived from water soluble metal salt. When the interaction between a surfactant and a water soluble metal salt is strong, the binding constant between a surfactant and a water soluble metal salt is high in an aqueous solution, and therefore it becomes possible to significantly lower the surface action of a surfactant.

For the dispersion of Step 1, a common stirrer or homogenizer may be used. If necessary, further dispersion can be performed by an ultrasonic treatment.

With regard to Step 1, from the viewpoint of productivity and inhibition of viscosity increase of the dispersion liquid, the dispersion concentration of hydrophobic resin microparticles in the dispersion liquid of hydrophobic resin particles is preferably 10% by mass or more to 30% by mass or less. Further, from the viewpoint of stabilization of dispersion state and formation of favorable core-shell structure, total concentration of the surfactant A and the surfactant B is preferably 0.2% by mass or more to 1.0% by mass or less compared to the dispersion liquid of the hydrophobic resin particles.

Further, in regard to the molar concentration of the surfactant A and the surfactant B in an aqueous medium, ratio of molar concentration between the surfactant A and the surfactant B, that is, [molar concentration of the surfactant A:molar concentration of the surfactant B] is preferably 1:3 to 1:15, and more preferably 1:7 to 1:15. When the molar concentration of the surfactant A and the surfactant B in an aqueous medium is within the aforementioned range, both the stabilization of dispersion state and formation of favorable core-shell structure can be achieved more favorably.

<Step 2>

Step 2 is a step for providing a dispersion liquid of resin microparticles in which resin microparticles are dispersed into an aqueous medium. For example, the dispersion liquid of resin microparticles is provided by following method.

At first, a resin for a shell is dissolved to an organic solvent. Obtained resin solution is added into an aqueous medium and dispersed by stir. After that, the organic solvent is removed to obtain the dispersion liquid of resin microparticles.

<Step 3>

Step 3 is a step for mixing the dispersion liquid of hydrophobic resin particles obtained by Step 1 and the dispersion liquid of resin microparticles obtained by Step 2. The addition amount of a dispersion liquid of resin microparticles for shell is, in terms of solid content of resin microparticles for shell, preferably 10% by mass or more to 50% by mass or less compared to the hydrophobic resin microparticles. When it is within the range, coating of the hydrophobic resin microparticles with the resin microparticles for shell can be performed at favorable balance.

Further, the dispersion liquid of resin microparticles for shell can be added all at once during Step 3, or added in portions during Steps 3 to 4.

<Step 4>

Step 4 is a step for adhering the resin microparticles to surfaces of the hydrophobic resin particles by adding a water soluble metal salt to a mixture resulting from the Step (3). Specifically, it is a step for unstabilizing the dispersion state of resin microparticles for shell and hydrophobic resin microparticles dispersed into an aqueous medium by adding a water soluble metal salt to the dispersion liquid and forming core-shell structured resin microparticles by adhering the resin microparticles for shell to a surface of the hydrophobic resin particles. In this regard, when the concentration of a surfactant having a surface action is high, aggregation occurs, first of all, among resin microparticles for shell, and thus core-shell structured resin particles may not be formed in favorable state. For such reasons, in the present invention, it is necessary to lower the surface action of the surfactant B by using a water soluble metal salt. If the surface action of the surfactant B is lowered such that the surface tension is 40 mN/m or higher, the surfactant B no longer functions as a surfactant. Thus, the actual concentration of a surfactant having a surface action is lowered, and therefore formation of core-shell structure is not inhibited. However, if all the surfactants have lower surface action by the water soluble metal salt, the hydrophobic resin microparticles are excessively unstabilized by an action of the water soluble metal salt, and thus aggregation occurs, first of all, among the hydrophobic resin microparticles, and formation of core-shell structure may not be processed. For such reasons, it is necessary in the present invention to use the surfactant A and the surfactant B in combination, and also necessary that the interaction between the surfactant A and the water soluble metal salt is weak while the interaction between the surfactant B and the water soluble metal salt is strong.

Examples of the water soluble metal salt include, although not particularly limited, metal salt of monovalent metal such as sodium and potassium; metal salt of divalent metal such as calcium and magnesium; and metal salt of trivalent metal such as iron and aluminum. However, to have a strong interaction between the surfactant A and the water soluble metals salt and to have a weak interaction between the surfactant B and the water soluble metals salt, metal salt of divalent metal such as calcium and magnesium is preferably used. Specific examples thereof include magnesium sulfate and calcium chloride.

The water soluble metals salt may be used either singly or in combination of two or more.

Further, in Step 4, the total addition amount of the water soluble metal salt is preferably 0.5% by mass or more to 20% by mass or less compared to the hydrophobic resin microparticles.

<Fusion Step>

During the fusion step, the core-shell structured resin particles produced by Step 3 are heated to the temperature equal to or higher than the glass transition temperature (Tg) of the hydrophobic resin microparticles for fusion. Accordingly, the core-shell structured resin particles can have an even surface so that loss of the resin microparticles for shell can be prevented. Further, before performing the fusion step, a chelating agent for chelating a metal salt, a pH controlling agent, a surfactant, or the like may be appropriately added to prevent melt adhesion among the core-shell structured resin particles.

Examples of the chelating agent for chelating a metal salt include ethylene diamine tetraacetic acid (EDTA) and its alkali metal salt such as Na salt, sodium gluconate, sodium tartarate, potassium citrate, sodium citrate, nitrotriacetate (NTA) salt, and various water soluble polymers containing both functionalities of COOH and OH (that is, polymeric electrolytes).

The heating temperature is not particularly limited if it is between the glass transition temperature (Tg) of the hydrophobic resin microparticles and the thermal decomposition temperature of the hydrophobic resin microparticles. With regard to the time for heating and fusion, short time may be sufficient if the heating temperature is high. On the other hand, when the heating temperature is low, a longer time is required. Thus, the time for heating and fusion is generally in the range of 10 min to 10 hours, although it may not be generally defined as it depends on the heating temperature.

<Cooling Step>

The cooling step is a step for cooling the temperature of an aqueous medium containing the core-shell structured resin particles to the temperature lower than the glass transition temperature (Tg) of the hydrophobic resin microparticles after the fusion process. If the cooling is not performed to the temperature lower than the Tg, coarse particles are easily produced during the post-treatment process. Specific cooling rate is 0.1 to 50° C./min.

<Post-Treatment Step>

In the post-treatment step, a dispersion liquid of core-shell structured resin particles obtained after cooling is washed, filtered, dried or the like to prepare the core-shell structured resin particles in powder form.

Next, the hydrophobic resin microparticles (core particles) and resin microparticles for shell that are used for the method for preparing the core-shell structured resin particles are explained.

As for the hydrophobic resin microparticles that are used in the present invention, any resin microparticles can be used if they have hydrophobicity. In the present invention, determination of hydrophobicity is carried out by the wettability test described below, and those requiring 30 ml or more of ethanol addition amount are determined to be hydrophobic.

To a 100 ml beaker containing 50 ml pure water, 0.01 g of the precisely weighed hydrophobic resin microparticles is added. Subsequently, under stirring with a magnetic stirrer, ethanol is continuously introduced under liquid surface at dropwise addition rate of 10 ml/min, while the hydrophobic resin microparticles are floated on the liquid surface. The time point at which the hydrophobic resin microparticles are suspended in a solution, and a hydrophobic resin microparticles are no longer observed on the liquid surface is determined as the end point. The hydrophobicity is determined based on the addition amount of ethanol until the end point.

Resins for forming the hydrophobic resin microparticles are not particularly limited, if they satisfy the hydrophobicity condition described above. Examples thereof include a homopolymer or a copolymer of styrenes such as styrene, parachloro styrene and α-methyl styrene (styrene resins); a homopolymer or a copolymer of esters having a vinyl group such as methyl acrylate, ethyl acrylate, n-propyl acrylate, n-butyl acrylate, lauryl acrylate, 2-ethyl hexyl acrylate, methyl methacrylate, ethyl methacrylate, n-propyl methacrylate, lauryl methacrylate and 2-ethyl hexyl methacrylate (vinyl resins); a copolymer between the styrenes and the esters having a vinyl group (styrene-acrylate resin); a homopolymer or a copolymer of olefins such as ethylene, propylene, butadiene and isoprene (olefin resin); a non-vinyl condensed resin such as an epoxy resin, a polyester resin and a polyether resin, and a graft polymer between the non-vinyl condensed resin and a vinyl monomer. The resin may be used either singly or in combination of two or more.

When the hydrophobic resin microparticles are used as toner, a polyester resin which has excellent strength in spite of low molecular weight is preferred among them.

When the hydrophobic resin microparticles are used as an electrophotographic toner (hereinafter, it is simply described as "use as toner"), the glass transition temperature (Tg) of the resin for forming the hydrophobic resin microparticles is preferably 30° C. or more to 60° C. or less. More preferably, it is 40° C. or more to 60° C. or less. When it is within the range, thermal stability is improved, and it becomes easier to obtain an image with high gloss value. Further, the glass transition temperature (Tg) is a physical property value measured with reference to JIS K7121, and it indicates the midpoint glass transition temperature as described by the standard condition.

When the hydrophobic resin microparticles are used as toner, the softening temperature (Tm) of the resin for forming the hydrophobic resin microparticles is preferably 70° C. or more to 110° C. or less. More preferably, it is 70° C. or more to 100° C. or less. Still more preferably, it is 80° C. or more to 100° C. or less. When the Tm is lower than 70° C., the offset property at high temperature is impaired even when wax is contained. On the other hand, when the Tm is higher than 110° C., low-temperature fixability is impaired. Meanwhile, the softening temperature (Tm) is measured by using a flow tester (CFT-500D, manufactured by SHIMADZU CORPORATION). Specifically, it is measured under the condition that the measurement sample amount is 1.2 g, a die with height of 1.0 mm and diameter of 1.0 mm is used, temperature increase rate is 4.0° C./min, pre-heating time is 300 seconds, load is 5 kg, and the temperature range for measurement is 60° C. or more to 200° C. or less. In the present invention, the temperature at which ½ of the sample is released; that is, the "melting temperature according to the ½ method" as described in the manual attached to "the Flow tester CFT-500D, an apparatus for evaluating flow characteristics" is taken as the softening temperature.

When the hydrophobic resin microparticles are used as toner, the volume-based median diameter of the hydrophobic resin microparticles is preferably 4.0 µm or more to 7.0 µm or less. Further, the volume-based median diameter can be measured by using a dynamic light scattering type particle size distribution measuring device (Nanotrac UPA-EX150, manufactured by NIKKISO CO., LTD.).

The hydrophobic resin microparticles can be prepared according to a known method. However, for the use as toner, a kneading pulverization method is preferably exemplified. According to the kneading pulverization method, resin microparticles having higher hydrophobicity can be prepared compared to a wet chemical method, and the obtained resin microparticles are not easily affected by moisture under highly humid environment. Further, according to the kneading pulverization method, it is possible to collect fine powders or coarse powders that are not suitable as toner, and to use them after further kneading, and thereby the toner can be produced with high efficiency.

Hereinafter, a method for preparing hydrophobic resin microparticles to be used as toner based on a kneading pulverization method is explained. First, the hydrophobic resin and necessary components such as a colorant and a release agent are mixed with each other by using a mixer such as a Henschel mixer and a ball mill. Subsequently, the mixture obtained is melt and kneaded by a heating kneader such as a kneader and an extruder. After cooling, the melt and kneaded product is pulverized and sized to remove coarse particles or fine powders. As a result, the hydrophobic resin microparticles can be obtained.

Examples of the colorant that may be used include a known cyan colorant, a magenta colorant, a yellow colorant and a black colorant.

Examples of the cyan colorant include a copper phthalocyanine compound and derivatives thereof, an anthraquinone compound, and a basic dye lake compound.

Examples of the magenta colorant include a condensed azo compound, a diketopyrrolopyrrole compound, an anthraquinone compound, a quinacridone compound, a basic dye lake compound, a naphthol compound, a benzimidazolone compound, a thioindigo compound and a perylene compound.

Examples of the yellow colorant include compounds that are represented by a condensed azo compound, an isoindolinone compound, an anthraquinone compound, an azo metal complex, a methine compound and an allyl amide compound.

Examples of the black colorant include carbon black and magnetic powder, and also those toned with black by using the aforementioned yellow, magenta and cyan colorant. The colorants may be used either singly or in combination, and also in solid solution state. The colorant used in the present invention is selected in consideration of a hue angle, chroma, lightness, lightfastness, OHP transparency and dispersion property into toner.

In the present invention, content of the cyan, magenta, yellow and black colorants (except magnetic powder) is preferably 1 part by mass or more to less than 20 parts by mass compared to 100 parts by mass of the resin for constituting the hydrophobic resin microparticles. When magnetic powder is used as a colorant, it is preferably 20 parts by mass or more to less than 150 parts by mass compared to 100 parts by mass of the resin for constituting the hydrophobic resin microparticles.

Examples of the release agent include polyolefins with low molecular weight such as polyethylene; silicones which have a melting point (softening point) upon heating; fatty acid amides such as oleic acid amide, erucic acid amide, licinoleic acid amide and stearic acid amide; ester waxes such as stearyl stearic acid; plant waxes such as carnauba wax, rice wax, canderilla wax, wood wax and jojoba oil; animal waxes such as bee wax; mineral and petroleum waxes such as motan wax, ozokerite, ceresin, paraffin wax, microcrystalline wax, Fisher-Tropsch wax and ester wax; and modified products thereof.

The melting point of the release agent is preferably 150° C. or lower. More preferably, it is 40° C. or more to 130° C. or less, and particularly preferably 40° C. or more to 110° C. or less. Further, content of the release agent is preferably 5 parts by mass or more to 20 parts by mass or less compared to 100 parts by mass of the resin for constituting the hydrophobic resin microparticles.

Next, resin microparticles for shell and a dispersion liquid of resin microparticles for shell that are used in the present invention are explained. As for the resin microparticles for shell used in the present invention, resin microparticles that have been conventionally known in the field may be used. When core-shell structured particles are used as toner, it is not particularly limited if it is resin used for a common toner.

The dispersion liquid of resin microparticles for shell may be prepared by dispersing the resin microparticles for shell into an aqueous medium. Specific method for preparation is as follows.

The dispersion liquid of resin microparticles for shell can be prepared according to a method well known in the field. For example, for a dispersion liquid of resin microparticles containing resin particles in which a vinyl monomer, in particular a styrene monomer, is contained as a structural component, the dispersion liquid of resin microparticles can be prepared by performing emulsion polymerization of the monomer using a surfactant or the like. In addition, when the resin that are prepared according to other method (for example, polyester resin) is used, if it is dissolved in an oily solvent, the resin is dissolved in a solvent to prepare an aqueous medium, resin particles are dispersed in the aqueous medium together with a surfactant or polymeric electrolytes by using a disperser such as homogenizer, and the solvent is removed by heating or reducing the pressure to prepare the dispersion liquid of resin particles.

Examples of the surfactant used for preparing the resin microparticles for shell include, although not particularly limited, an anionic surfactant such as sulfate ester salt, sulfonate salt, carboxylate salt, phosphate ester and soap; a cationic surfactant such as amine salt and quaternary ammonium salt; a non-ionic surfactant such as polyethylene glycol, alkyl phenol ethylene oxide adducts and polyhydric alcohols.

Further, shape of the resin microparticles for shell is preferably spherical. When the resin microparticles are not spherical, these are preferably turned into spheres by heat treatment at the temperature which is the same or higher than the glass transition temperature (Tg) of the resin for shell. When the resin microparticles for shell are not spherical, aggregation among the resin microparticles for shell increases, and thereby, it difficult to evenly cover the core during core-shell formation.

As for the resin for forming the resin microparticles for shell, any resin such as a styrene resin and a polyester resin can be used. However, for use as toner, a polyester resin having excellent strength in spite of low molecular weight is preferable.

It is also preferable that, when the resin microparticles for shell are used as a shell of the core-shell structured resin particles for toner, an ionic group such as a carboxylic acid group, a sulfonic acid group and an amino group is contained in a skeleton of the resin for forming the resin microparticles for shell. More preferably, a carboxylic acid group is contained in the skeleton of the resin for forming the resin microparticles for shell. For such case, acid value of the resin is preferably 3 to 35 mgKOH/g, and more preferably 3 to 15 mgKOH/g, from the viewpoint of dispersion property into an aqueous medium and environmental safety when used as toner.

Further, for used as toner, glass transition temperature (Tg) of the resin for forming the resin microparticles for shell is preferably 60 to 80° C., and more preferably 65 to 80° C., from the viewpoint of storage stability and low-temperature fixability.

When the resin microparticles for shell are used as toner, the volume-based median diameter of the resin microparticles for shell is preferably 0.05 to 0.3 μm, and more preferably 0.08 to 0.3 μm. When it is within the range, good adhesion property of the resin microparticles for shell for hydrophobic resin microparticles can be obtained and also toner having appropriate shell layer thickness can be obtained.

When the core-shell structured resin particles are used as toner particles, it is possible to add inorganic particles such as silica, alumina, titania and calcium carbonate or particles of resin such as a vinyl resin, a polyester resin and a silicone resin onto surface of the core-shell structured resin particles.

EXAMPLES

Hereinafter, the invention is described in more detail in view of the examples and the comparative examples, but the invention is not limited to them. Further, parts and % described in the examples and the comparative examples are all based on mass, unless specifically described otherwise.

Preparation Example for Hydrophobic Resin Microparticles

| | |
|---|---|
| polyester resin A | 100 parts by mass |
| [composition (molar ratio); polyoxypropylene (2.2)-2,2-bis(4-hydroxyphenyl)propane:polyoxyethylene (2.0)-2,2-bis(4-hydroxyphenyl)propane:terephthalic acid:fumaric acid:trimellitic acid = 25:25:26:20:4, number-average molecular weight (Mn) = 3,500, weight-average molecular weight (Mw) = 10,300, Mw/Mn = 2.9, softening temperature (Tm) = 96° C., glass transition temperature (Tg) = 56° C.] | |
| release agent | 10 parts by mass |
| (behenyl behenate, melting point: 75° C.) | |
| colorant | 5 parts by mass |
| [Cyan pigment (Pigment Blue 15:3)] | |

The aforementioned mixture was melt-kneaded using a twin screw extruder preheated to 130° C., and the mixture obtained after cooling was coarsely pulverized using a hammer mill. By using a turbo mill, the coarsely pulverized product was pulverized to finer powder, which was then classified with an pneumatic classifier to prepare hydrophobic resin microparticles A having median particle diameter of 7 μm based on volume. The wettability test was performed with regard to the hydrophobicity of the hydrophobic resin microparticles A obtained, and as a result, it was found that the ethanol addition amount is 46 ml and the hydrophobic resin microparticles A correspond to hydrophobic resin microparticles.

(Preparation Example for Dispersion Liquid of Resin Microparticles for Shell)

| | |
|---|---|
| polyester resin B [composition (molar ratio); polyoxypropylene (2.2)-2,2-bis(4-hydroxyphenyl)propane:isophthalic acid:terephthalic acid = 100:50:50, Mn = 4,600, Mw = 16,500, peak molecular weight (Mp) = 10,400, Mw/Mn = 3.6, Tm = 117° C., Tg = 70° C., acid value = 13 mgKOH/g] | 60 parts by mass |
| anionic surfactant (NEOGEN RK manufactured by Dai-ichi Kogyo Seiyaku Co., Ltd.) | 0.3 parts by mass |
| N,N-dimethylamino ethanol | 1.9 parts by mass |
| tetrahydrofuran (manufactured by Wako Pure Chemical Industries, Ltd.) | 200 parts by mass |

The aforementioned components were mixed, dissolved, and stirred at 4,000 rpm using an ultra-high speed stirrer, T. K. ROBOMIX (manufactured by PRIMIX Corporation). In addition, 177.8 g of ion exchange water was added dropwise thereto. After that, tetrahydrofuran was removed using an evaporator to obtain the dispersion liquid of resin microparticles A for shell having solid matter content of 30% by mass. Further, the volume-based median diameter of the resin microparticles was measured by using a dynamic light scattering particle size analyzer (Nanotrac, manufactured by NIKKISO CO., LTD.). As a result, it was found to be 0.09 μm.

(Measurement of Surface Tension of Aqueous Solution of Surfactant)

By using an automatic surface tensiometer CBVP-Z (manufactured by Kyowa Interface Science Co., LTD.) with a platinum plate cleaned with red heat, the measurement was performed in fully automatic mode. Surface tension of each aqueous solution is as follows.

| | |
|---|---|
| 5 mmol/L aqueous solution of sodium dodecylbenzene sulfonate | 33 mN/m |
| 5 mmol/L aqueous solution of sodium laurate | 22 mN/m |
| aqueous mixture solution containing 5 mmol/L sodium dodecylbenzene sulfonate and 2.5 mmol/L magnesium sulfate | 27 mN/m |
| aqueous mixture solution containing 5 mmol/L sodium laurate and 2.5 mmol/L magnesium sulfate | 45 mN/m |
| aqueous mixture solution containing 5 mmol/L sodium dodecylbenzene sulfonate and 2.5 mmol/L calcium chloride | 27 mN/m |
| aqueous mixture solution containing 5 mmol/L sodium laurate and 2.5 mmol/L calcium chloride | 51 mN/m |
| aqueous mixture solution containing 5 mmol/L sodium dodecylbenzene sulfonate and 5 mmol/L sodium chloride | 32 mN/m |
| aqueous mixture solution containing 5 mmol/L sodium laurate and 5 mmol/L sodium chloride | 22 mN/m |

Example 1

| | |
|---|---|
| hydrophobic resin microparticles A | 100 parts by mass |
| sodium dodecylbenzene sulfonate | 1 part by mass |
| sodium laurate | 6 parts by mass |
| water | 900 parts by mass |

The above components were added to a tall beaker and stirred with a stirring wing at 25° C. for 60 min in a water bath for heating. Subsequently, ultrasonic treatment was performed for 30 min to disperse the hydrophobic resin microparticles A in water.

Subsequently, dispersion liquid of resin microparticles A for shell was added in an amount of 16.7 parts by mass and then stirred for 10 min under the 25° C. condition. In addition, 2% by mass aqueous solution of calcium chloride (water soluble metal salt) was slowly added dropwise thereto. In this state, a small amount of the solution was extracted from time to time, filtered through a microfilter (2 μm), and an aqueous solution of calcium chloride was continuously added until the filtered dispersion liquid is transparent, followed by further stirring at 25° C. After confirming that the filtered dispersion liquid is transparent, dispersion liquid of resin microparticles A for shell was added again in an amount of 16.7 parts by mass and additionally stirred. After confirming again that the filtered dispersion liquid is transparent, dispersion liquid of resin microparticles A for shell was added again in an amount of 16.7 parts by mass and additionally stirred. After confirming that the filtered dispersion liquid is transparent, it was washed with pure water, filtered, and then dried to obtain core-shell structured resin particles.

Example 2

The core-shell structured resin particles were obtained in the same manner as Example 1 except that calcium chloride is changed to magnesium sulfate.

Example 3

The core-shell structured resin particles were obtained in the same manner as Example 1 except that addition amount of sodium dodecylbenzene sulfonate is changed to 0.5 parts by mass.

Example 4

The core-shell structured resin particles were obtained in the same manner as Example 1 except that addition amount of sodium laurate is changed to 3 parts by mass.

Comparative Example 1

The core-shell structured resin particles were obtained in the same manner as Example 1 except that addition amount of sodium dodecylbenzene sulfonate is changed to 7 parts by mass and sodium laurate is not used.

Comparative Example 2

The core-shell structured resin particles were obtained in the same manner as Example 1 except that addition amount of sodium laurate is changed to 7 parts by mass and sodium dodecylbenzene sulfonate is not used.

Comparative Example 3

The core-shell structured resin particles were obtained in the same manner as Example 1 except that calcium chloride is changed to sodium chloride.

By using the core-shell structured resin particles obtained from Examples 1 to 4 and Comparative Examples 1 to 3, the following evaluations were made. The results are listed in Table 1.

(Determination of Presence or Absence of Core-Shell Structure)

The core-shell structured resin particles which have been vapor-deposited with platinum were observed by using a scanning electron microscope (FE-SEM) [S4800, manufactured by Hitachi High-Technologies Corporation] with magnification ratio of 20,000. Thereafter, the evaluations were made according to the following criteria.

(Criteria for Evaluation)

A: Hydrophobic resin microparticles were completely covered with the resin microparticles for shell.

B: Hydrophobic resin microparticles were covered with the resin microparticles for shell, but some of them were exposed.

C: Almost all of the hydrophobic resin microparticles were exposed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-53393, filed Mar. 9, 2012, which is hereby incorporated by reference herein in its entirety.

TABLE 1

| | Surfactant A | Surfactant B | Ratio of molar concentration between the surfactant A and the surfactant B [A:B] | Metal salt | Surface tension of aqueous mixture solution containing the surfactant A and metal salt (mN/m) | Surface tension of aqueous mixture solution containing the surfactant B and metal salt (mN/m) | Presence or absence of core-shell structure |
|---|---|---|---|---|---|---|---|
| Example 1 | Sodium dodecylbenzene sulfonate | Sodium laurate | 1:9.4 | $CaCl_2$ | 27 | 51 | A |
| Example 2 | Sodium dodecylbenzene sulfonate | Sodium laurate | 1:9.4 | $MgSO_4$ | 27 | 45 | A |
| Example 3 | Sodium dodecylbenzene sulfonate | Sodium laurate | 1:18.7 | $CaCl_2$ | 27 | 51 | B |
| Example 4 | Sodium dodecylbenzene sulfonate | Sodium laurate | 1:4.7 | $CaCl_2$ | 27 | 51 | B |
| Comparative Example 1 | Sodium dodecylbenzene sulfonate | — | — | $CaCl_2$ | 27 | | C |
| Comparative Example 2 | — | Sodium laurate | — | $CaCl_2$ | | 51 | C |
| Comparative Example 3 | Sodium dodecylbenzene sulfonate | Sodium laurate | 1:9.4 | NaCl | 32 | 22 | C |

What is claimed is:

1. A method for producing core-shell structured resin particles, comprising the steps of:

(I) providing a dispersion liquid of hydrophobic resin particles in which the hydrophobic resin particles are dispersed into an aqueous medium containing an anionic surfactant A and an anionic surfactant B;

(II) providing a dispersion liquid of resin microparticles in which the resin microparticles are dispersed into an aqueous medium;

(III) mixing the dispersion liquid of hydrophobic resin particles and the dispersion liquid of resin microparticles; and (IV) adhering the resin microparticles to surfaces of the hydrophobic resin particles by adding a water soluble metal salt to a mixture resulting from the step (III), wherein the surfactant A and the surfactant B satisfy the following conditions (i) to (iv):

(i) surface tension of 5 mmol/L aqueous solution of the surfactant A<40 mN/m;

(ii) surface tension of 5mmol/L aqueous solution of the surfactant A, in which the metal salt is contained in an amount to generate an equivalent amount of cations to an amount of anions derived from the surfactant A<40 mN/m;

(iii) surface tension of 5 mmol/L aqueous solution of the surfactant B<40 mN/m; and (iv) surface tension of 5mmol/L aqueous solution of the surfactant B, in which the metal salt is contained in an amount to generate an equivalent amount of cations to an amount of anions derived from the surfactant B>40 mN/m wherein a molar concentration of the surfactant A and the surfactant B in the aqueous medium is: the surfactant A:the surfactant B=1:7 to 1:15.

2. The method for producing core-shell structured resin particles according to claim 1.

3. The method for producing core-shell structured resin particles according to claim 1.

4. The method for producing core-shell structured resin particles according to claim 1.

* * * * *